(No Model.)
D. B. HASELTON.
COTTON HARVESTER.
No. 364,759. Patented June 14, 1887.
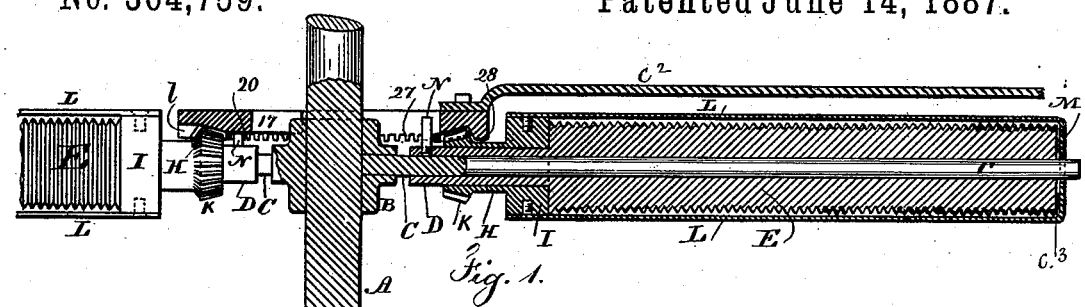
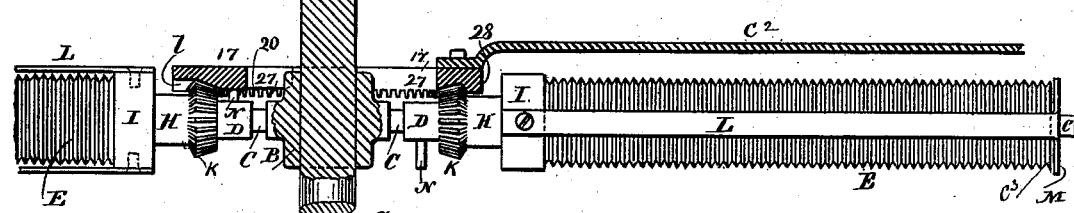
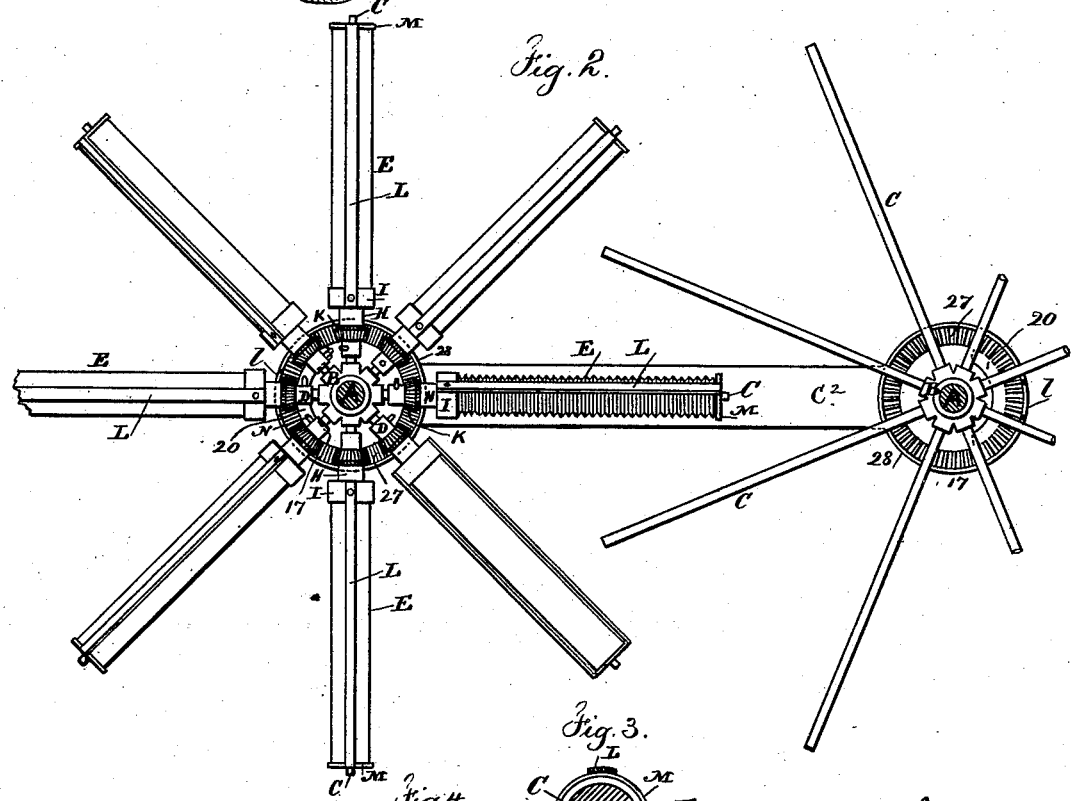
Witnesses
Chas H. Smith
J. Staib
Inventor
Daniel B. Haselton
per Lemuel W. Serrell
atty

UNITED STATES PATENT OFFICE.

DANIEL B. HASELTON, OF CHARLESTON, SOUTH CAROLINA, ASSIGNOR TO THE SOUTHERN COTTON PICKING COMPANY, OF SAME PLACE.

COTTON-HARVESTER.

SPECIFICATION forming part of Letters Patent No. 364,759, dated June 14, 1887.

Application filed February 8, 1886. Serial No. 191,110. (No model.)

*To all whom it may concern:*

Be it known that I, DANIEL B. HASELTON, a citizen of the United States, residing in Charleston, in the State of South Carolina, have invented an Improvement in Cotton-Harvesters, of which the following is a specification.

In Letters Patent Nos. 328,116 and 319,710, granted to me, a revolving shaft is made use of having hubs with projecting arms, upon which stems are revolved that act to gather the cotton as the machine is drawn along between plants, and the cotton is delivered from the stems into a receptacle; and in my Patent No. 313,422 the teeth of the picking device are upon an inner cylinder revolving within a cylinder having openings through it, the outer cylinder acting to strip the cotton off the teeth on the inner cylinder.

In my present improvements I make use of stems corresponding generally to those set forth in said patents and combine with the same wipers, and construct the actuating mechanism in such a manner that the wipers and stems revolve together when gathering the cotton, and the motion of the stems is arrested when passing through the receptacle for the cotton, and the revolving motion of the wipers is continued so as to discharge the cotton from the surfaces of such stems.

In the drawings, Figure 1 is a vertical section of the gear rings or racks, showing one of the arms with one picking-stem thereon in section, the other in elevation. Fig. 2 is an inverted plan of the gear-rings, a section of the vertical shafts, the range of radial arms projecting from one hub, and stems on the arms that project from the other hub. Fig. 3 is a cross-section of the stems and of the wipers, and Fig. 4 is an end view of one of the tubular shafts and pinions.

There are two vertical shafts with projecting radial arms having upon them picking-stems, as in my aforesaid patents. The picking-stems act to collect the cotton from the sides of the plants. The shafts pass at opposite sides of the row of plants, and the picking-stems reach beyond the middle of the plants, so as to gather all the cotton.

The shafts A are vertical, or nearly so, and they are revolved by chains and wheels that connect the shafts to the supporting-wheels of the machine, so that said shafts are revolved as the machine is drawn across the field.

Upon each shaft A, at suitable distances apart, are hubs B, from which project the fixed arms C, as in said Patent No. 328,116, and upon these shafts the picking stems and wipers are revolved, as hereinafter described. These arms C may extend all the way through the stems E, as in said patent, or only part way through the same. The revolving arms D of each stem are tubular or partially so. The stems E are made with surfaces adapted to gathering the cotton, and the character and action of such stems will be understood from said patents.

The driving-racks 17 are in the form of rings surrounding the respective shafts between one tier of stems and the next, and the driving-racks are connected together in pairs by the cross-bars $C^2$, so that they are kept from revolving, one rack of each pair surrounding one of the vertical shafts, and the other rack the other shaft. Each driving-rack is made as next described. There is a rim at 28 that is continuous around the driving-rack, except at $l$, where there is a notch that allows for the stem, its wiper, and gear to be drawn off. This driving-rack has gear-teeth 27 all around it on the under side within the rim 28, and there is within the circular range of gear-teeth 27 a delay surface or flange, 20, that is adjacent to the box or receptacle for the cotton.

Upon the tubular axle or sleeve D of each stem E is a sleeve, H, with a pinion, K, the teeth of which mesh into the teeth upon the circular rack 27; and there is a flange or ring, I, also upon the sleeve H, which ring I is slightly larger in diameter than the cylinder E; and L are wiping-bars connected at one end to the ring I, and at the other end to the disk M, that surrounds the outer end of the stem shaft or axle, so as to revolve thereon; and at N is an arm or finger projecting from the axle or sleeve D, and of a length to come into contact with and be stopped by the delay-surface 20. The rim 28, coming between the pinion K and the ring I, prevents the stem being drawn off or the parts separating, except where there is the notch $l$ in said flange; and it will now be apparent that the shafts A as they revolve carry around with them the hubs B and the ranges of radially-projecting arms C; and the pinions K, rolling under the stationary circular racks 27, are revolved thereby and revolve both the wipers and the stems, the latter being driven by the friction; but as soon as the arms N come into contact with the delay surfaces or flanges 20 the stems are held from revolving, while the wipers continue to revolve around the stems and separate the cotton from the same and throw it off into the box or receptacle.

It is preferable to place the rack-teeth 27 on the under sides of the driving-rack 17, so that the weight of the driving-rack resting upon the pinions will keep the teeth in gear. A spring-washer may be applied at $C^3$ around each arm C and between the ends of the stems and the disks M, or in any other convenient position to increase the friction of the parts and insure the rotation of the picker-stems by the pinions; but usually the friction of the wipers against the surfaces of the stems will be sufficient to insure the rotation of the stems while picking the cotton.

I claim as my invention—

1. The combination, with the cotton-picking stems E and the means for supporting and rotating the same, of wipers composed of bars extending longitudinally upon the stems, heads or rings connecting the same, and means for stopping the rotation of the stems and for continuing the rotation of the wipers around the stems for discharging the cotton, substantially as set forth.

2. The combination, with the shafts A, hub B, and radially-projecting shafts C, of the stems E upon the arms, the wipers formed of bars connected to heads or rings, and pinions for revolving the wipers around the stems for discharging the cotton, substantially as set forth.

3. The shaft A, hubs or supports B, arms C, and stems E, in combination with the wipers, their tubular sleeves and rings, and the pinions and circular racks for revolving the same, substantially as set forth.

4. The shaft A, hubs or supports B, arm C, and stems E, in combination with the wipers, the tubular sleeves and pinions for the same, the rims 28, the circular racks for the pinions, the delay surfaces or flanges 20, and the arms N for holding the stems while the wipers continue to revolve, substantially as set forth.

5. The combination, with the picking-stems and their shafts, of mechanism, substantially as set forth, for revolving the same in picking the cotton, and revolving wipers for discharging the cotton by arresting the rotation of the picker-stems while the wipers continue their movements, substantially as set forth.

Signed by me this 6th day of January, A. D. 1886.

DANIEL B. HASELTON.

Witnesses:
ELLISON A. SMYTH, Jr.,
J. E. HARVEY.